Figure 9:
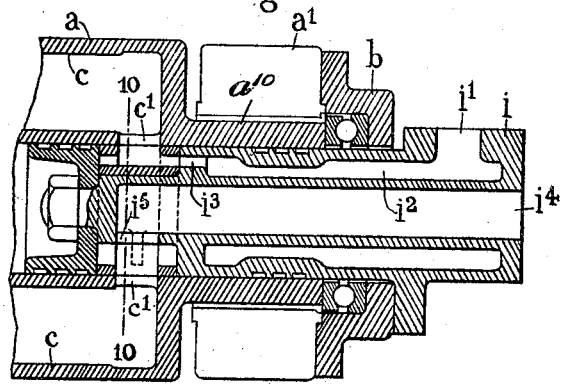

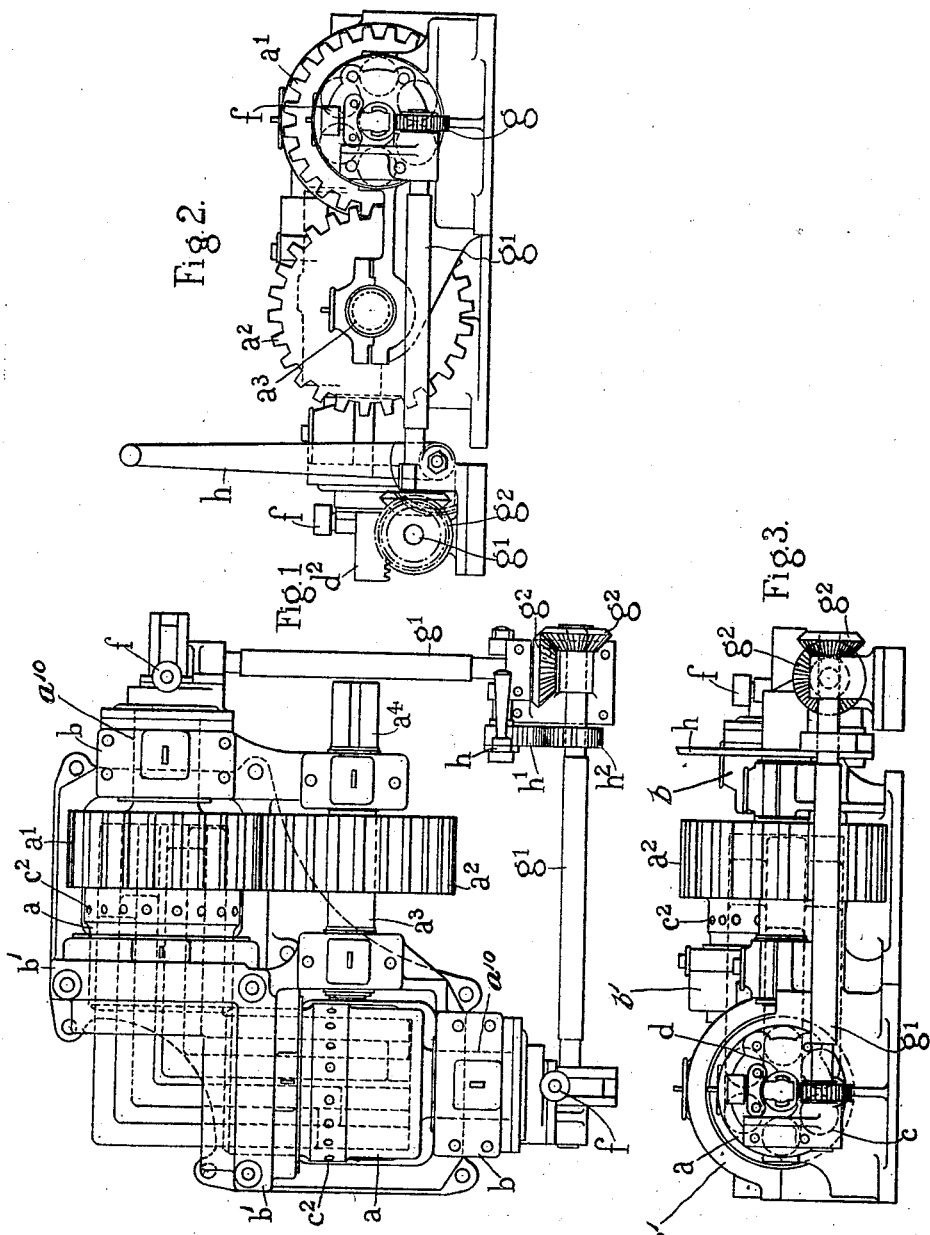

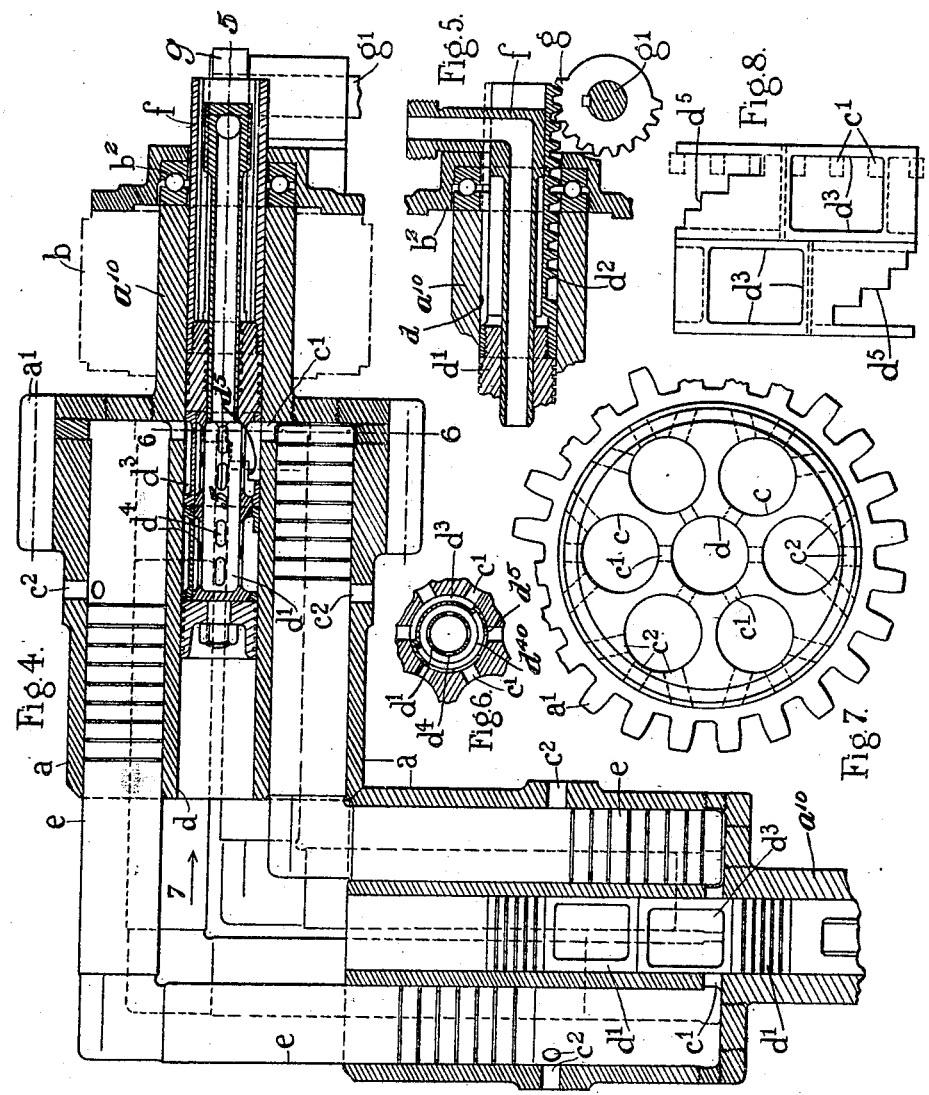

Nov. 4, 1924.  1,514,299
J. MEREDITH
FLUID PRESSURE ENGINE
Filed Feb. 15, 1923  3 Sheets-Sheet 3

Inventor
John Meredith
by Knight Bros
Attorneys

Patented Nov. 4, 1924.

1,514,299

UNITED STATES PATENT OFFICE.

JOHN MEREDITH, OF HANDSWORTH, BIRMINGHAM, ENGLAND, ASSIGNOR OF ONE-HALF TO JOHN THOMAS GOODWIN, OF CHESTERFIELD, ENGLAND.

FLUID-PRESSURE ENGINE.

Application filed February 15, 1923. Serial No. 619,309.

*To all whom it may concern:*

Be it known that I, JOHN MEREDITH, a subject of the King of Great Britain, residing at 26 Booth Street, Handsworth, Birmingham, England, have invented new and useful Improvements in Fluid-Pressure Engines, of which the following is a specification.

The object of the present invention is to provide an improved fluid pressure engine. The term "engine" hereinafter used in a broad sense in the description and claims comprises a motor, compressor or pump.

The invention relates to that type of engine having two rotating bodies each containing a series of cylinders having parallel axes arranged in a circle, the two rotating bodies having their axes at a right angle to each other in one plane and each cylinder containing a piston, the pistons of corresponding cylinders in the two rotating bodies being connected at a right angle and thereby connecting corresponding cylinders.

The fluid pressure may be compressed air, steam, water or the products of ignited spirit or fixed gas. When the pressure is admitted to two corresponding cylinders, the connected pistons of these cylinders move longitudinally of the cylinders and also in a circular path at right angles to the longitudinal motion thereby causing both of the bodies to rotate on their axes.

The invention consists in the combination and arrangement of parts herein shown and described.

According to the present invention, each rotating body is formed with a hollow shaft mounted in bearings and has a central valve chamber containing a valve which distributes the fluid pressure radially to the cylinders in regular order. The valve chamber is formed partly within the rotating body and partly within the hollow shaft. Each cylinder has an inlet port, which may also act as an exhaust port, but if a separate exhaust port be employed, it is adapted to be uncovered by the piston at or near the end of its stroke. The valves are so constructed that when the pistons have covered the separate exhaust ports, if such be employed, on the return stroke communication is opened between some of the cylinders to reduce compression. If desired, however, the fluid pressure may be admitted to the cylinders of one rotating body only and the cylinders of the other rotating body may be employed merely as guides for the pistons or as a pump or compressor.

The valves are stationary in use, but may be arranged to slide axially and be operated by racks and pinions connected by suitable gearing for the purpose of reversing the engine and also adjusting the cut-off.

The rotating bodies are provided with suitable means such as pulleys or gear wheels to communicate the motion to other mechanism.

If the rotating bodies be driven they will act as a pair of rotary pumps for raising liquid or compressing air or gas.

The invention is illustrated in the accompanying drawings in which Figure 1 is a plan, Figure 2 is a side elevation and Figure 3 is an end elevation of a complete engine. Figure 4 is a horizontal section taken through the axes of the two rotating bodies and Figure 5 is a vertical section taken through the axis of one end of the engine on line 5—5 of Fig. 4. Figure 6 is a vertical section through the valve taken on the line 6—6 of Figure 4. Figure 7 is an end elevation of one of the rotating bodies seen in the direction of the arrow 7, Figure 4. Figure 8 is a development of the exterior of one of the valves.

Figure 10:
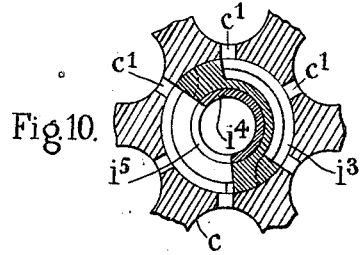
Figure 11:
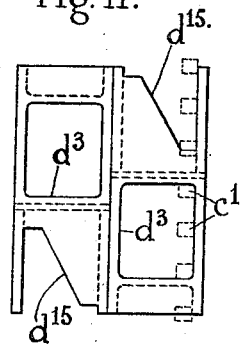

Figure 9 is a vertical axial section through one end of the machine corresponding in position with line 5—5 of Fig. 4 and Figure 10 is a vertical section on the line 10—10 of Figure 9 showing a modification of the central valve shown in Figs. 1 to 5. Figure 11 shows a modified development of the exterior of the valve.

$a$ $a$ are the rotating bodies each having a hollow shaft $a^{10}$ at one end mounted in bearings $b$ $b$. The rotating bodies $a$ $a$ are mounted at their other ends in bearings $b^1$. Each hollow shaft $a^{10}$ has also a thrust bearing $b^2$. Each rotating body $a$ is bored to form cylinders $c$. A central valve chamber $d$ is formed partly within each rotating body $a$ and partly within the hollow shaft $a^{10}$. One rotating body is shown provided with a gear wheel $a^1$ giving motion to a second gear wheel $a^2$ on a shaft $a^3$ which may be formed at its end $a^4$ to carry means for communicating motion such as a pulley or gear wheel. Each cylinder $c$ is in communication with the valve chamber $d$ through the inlet ports $c^1$. When the valve shown in Figures 4, 6 and 8 is used, each cylinder $c$ has several exhaust ports $c^2$ which are uncovered by the pistons $e$ towards the ends of their strokes.

The pistons $e$ are connected in pairs at a right angle to each other as shown more clearly in Figure 4, where two pistons are in their innermost positions and two others are in their outermost positions uncovering the exhaust ports $c^2$. The pistons $e$ slide within and connect corresponding cylinders $c$.

Each valve $d^1$ is normally stationary but for reversing it is caused to slide within its chamber $d$ and over the exterior of the fixed fluid pressure supply pipe $f$. The valves $d^1$ have each a rack $d^2$ receiving motion from the toothed wheels $g$ each mounted on a shaft $g^1$. The shafts $g^1$ are geared together by bevel wheels $g^2$ and are moved for reversing and cut off by the hand lever $h$ and toothed segment $h^1$ gearing with the toothed wheel $h^2$ on one of the shafts $g^1$.

Figure 8 is a development of the exterior of the valve illustrated in Figures 4 and 6 in which $d^3$, $d^3$ are recesses or chambers which allow communication between the cylinders $c$ on the return strokes of the pistons $e$ to reduce compression after the exhaust ports $c^2$ are closed. The valves are provided with a series of apertures $d^4$ in an inner sleeve which communicate with a lateral arc-shaped opening $d^{40}$ which allows the pressure fluid to enter simultaneously several inlet ports $c^1$ as they pass around the fixed valve $d^1$ as seen in Figs. 4 and 6. Cut-off is effected according to the position to which the whole valve is moved owing to the steps $d^5$ shown in Fig. 4 and Figure 8. Instead of employing steps $d^5$ the valve may be formed with inclines $d^{15}$ shown in Figure 11 corresponding to the general line of the steps $d^5$. One half of each development to the right or left of the central vertical line shows the arrangement for driving in one direction and the other half shows the arrangement for driving in the reverse direction.

In the modification shown in Figures 9 and 10, the valve $i$ has a lateral opening $i^1$ communicating with a circular passage $i^2$ which latter communicates simultaneously by means of the arc-shaped slot $i^3$ with three of the ports $c^1$ in the cylinders $c$. The valve $i$ has also a central passage $i^4$ which communicates by means of the lateral passage $i^5$ with three other ports $c^1$ in the cylinders $c$. One of the passages $i^1$ or $i^4$ is for the admission of the fluid pressure and the other of these two passages is for the outlet. In this construction it will be unnecessary to provide the cylinders with exhaust ports $c^2$ as shown in Figures 1, 3, 4 and 7. It will be understood by admitting the fluid pressure to the inlet $i^1$ or to the inlet $i^4$ that the engine when used as a motor may be driven in either direction. When used as a compressor or pump either passage $i^2$ or $i^4$ may be the inlet, the other passage being the outlet.

The engine shown is particularly adapted to be driven by compressed air and its compact design enables it to be easily enclosed within a casing when necessary for operating in situations exposed to dust and dirt.

What I claim as my invention is:—

1. An improved fluid pressure engine having two rotating bodies, the axes of which are in one plane and at right angles to each other, a hollow shaft formed at one end of each rotating body, bearings in which the hollow shafts are mounted, cylinders having parallel axes arranged in a circle in each rotating body, inlet ports in each cylinder, double pistons, the two parts of which are connected at right angles and slide in and connect corresponding cylinders in each rotating body, an axial valve chamber, located partly within each hollow shaft and partly in each rotating body, a valve located in each axial valve chamber and having a lateral arc-shaped opening communicating simultaneously with several inlet ports, a supply pipe leading to the axial valve and means for allowing the cylinders to discharge, substantially as set forth.

2. An improved fluid pressure engine having two rotating bodies, the axes of which are in one plane and at right angles to each other, a hollow shaft formed at one end of each rotating body, bearings in which the hollow shafts are mounted, cylinders having parallel axes arranged in a circle in each rotating body, inlet ports in each cylinder, double pistons, the two parts of which are connected at right angles and slide in and connect corresponding cylinders in each rotating body, an axial valve chamber, located partly within each hollow shaft and partly in each rotating body, a valve located in each axial valve chamber and having a lateral arc-shaped opening communicating simultaneously with several inlet ports, a supply pipe leading to the axial valve, means for giving longitudinal movement to each valve and means for allowing the cylinders to discharge, substantially as set forth.

3. An improved fluid pressure engine having two rotating bodies, the axes of which are in one plane and at right angles to each other, a hollow shaft formed at one end of each rotating body, bearings in which the hollow shafts are mounted, cylinders having parallel axes arranged in a circle in each rotating body, inlet ports in each cylinder, double pistons, the two parts of which are connected at right angles and slide in and connect corresponding cylinders in each rotating body, an axial valve chamber, located partly within each hollow shaft and partly in each rotating body, a valve located in each axial valve chamber and having a lateral arc-shaped opening communicating simultaneously with several inlet ports, a supply pipe leading to the axial valve, a rack formed on each valve, toothed wheels gearing with said racks, shafts on which the toothed wheels are fixed, bevel wheels connecting the shafts, means for rotating one of the shafts and means for allowing the cylinders to discharge, substantially as set forth.

4. An improved fluid pressure engine having two rotating bodies, the axes of which are in one plane and at right angles to each other, a hollow shaft formed at one end of each rotating body, bearings in which the hollow shafts are mounted, cylinders having parallel axes arranged in a circle in each rotating body, double pistons, the two parts of which are connected at right angles and slide in and connect corresponding cylinders in each rotating body, a gear wheel on one rotating body, a second gear wheel driven by the first mentioned gear wheel, a shaft on which the second gear wheel is mounted and adapted to carry means for communicating motion, an axial valve chamber located partly within each hollow shaft and partly in each rotating body, a valve located in each axial valve chamber and having a lateral opening communicating simultaneously with several cylinders, a supply pipe leading to the axial valve and means for allowing the cylinders to discharge, substantially as set forth.

In witness whereof I have set my hand.

JOHN MEREDITH.